(12) United States Patent
Chang et al.

(10) Patent No.: US 12,439,534 B2
(45) Date of Patent: Oct. 7, 2025

(54) ROTATING DEVICE PROVIDING ROTATION WITH FAILSAFE RELEASE ON OVERLOAD AND ROTATABLE DISPLAY APPARATUS

(71) Applicants: Futaijing Precision Electronics (Yantai) Co., Ltd., Yantai (CN); HON HAI PRECISION INDUSTRY CO., LTD., New Taipei (TW)

(72) Inventors: Yu-Sheng Chang, New Taipei (TW); Chi-Cheng Wen, New Taipei (TW); Chih-Cheng Lee, New Taipei (TW); Wen-Bin Huang, New Taipei (TW); Tsung-Hsin Wu, New Taipei (TW); Yu-Chih Cheng, New Taipei (TW); Hsiu-Fu Li, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 616 days.

(21) Appl. No.: 17/872,159

(22) Filed: Jul. 25, 2022

(65) Prior Publication Data
US 2023/0320004 A1    Oct. 5, 2023

(30) Foreign Application Priority Data
Mar. 29, 2022   (CN) .......................... 202210320127.6

(51) Int. Cl.
*H05K 5/02*     (2006.01)
*F16C 11/04*    (2006.01)
*G06F 1/16*     (2006.01)

(52) U.S. Cl.
CPC ............ *H05K 5/0217* (2013.01); *F16C 11/04* (2013.01); *G06F 1/1601* (2013.01)

(58) Field of Classification Search
CPC ...... H05K 5/0217; F16C 11/04; G06F 1/1601
See application file for complete search history.

(56) References Cited

U.S. PATENT DOCUMENTS

| | | | | |
|---|---|---|---|---|
| 3,593,542 | A * | 7/1971 | Urayama | F16D 43/2028 464/37 |
| 2008/0083293 | A1* | 4/2008 | Sawai | F16M 11/10 74/412 TA |

(Continued)

FOREIGN PATENT DOCUMENTS

| | | |
|---|---|---|
| CN | 202389303 U | 8/2012 |
| CN | 107631005 A * | 1/2018 |

(Continued)

*Primary Examiner* — Terrell L Mckinnon
*Assistant Examiner* — Ding Y Tan
(74) *Attorney, Agent, or Firm* — ScienBiziP, P.C.

(57) ABSTRACT

A rotating device which releases in the event of overload caused by external forceful counter-rotation includes positioning assemblies, a connecting assembly, and a driving assembly. Each positioning assembly includes a positioning member and sleeving member, part of the positioning member is positioned in the sleeving member and the positioning member abuts a first abutting portion in the sleeving member. The connecting assembly has a first end carrying mounting grooves, the mounting grooves themselves carrying the positioning assemblies. The driving assembly is connected to the first end, and when an external force of a certain magnitude is received by the positioning member, the positioning member moves into the sleeving member, and the driving assembly is thereby separated from and the positioning member, preventing the driving assembly from being damaged. A rotatable display apparatus with the rotating device is also disclosed.

16 Claims, 6 Drawing Sheets

(56) References Cited

U.S. PATENT DOCUMENTS

2015/0094155 A1* 4/2015 Franceschi ................ F16D 7/08
　　　　　　　　　　　　　　　　　　　　464/32
2017/0051818 A1* 2/2017 Ebke ........................ F16D 47/02
2024/0369109 A1* 11/2024 Davis .................... F16D 43/206

FOREIGN PATENT DOCUMENTS

| CN | 110145666 B | * | 11/2021 | ............. B60R 11/02 |
| CN | 113638983 A |   | 11/2021 |                          |
| IT | 1220479 B   | * | 6/1990  | ......... F16D 43/2028   |

\* cited by examiner

ROTATING DEVICE PROVIDING ROTATION WITH FAILSAFE RELEASE ON OVERLOAD AND ROTATABLE DISPLAY APPARATUS

FIELD

The subject matter herein relates to technical field of displaying device, especially relates to a rotating device and a rotatable display apparatus having the rotating device.

BACKGROUND

A display screen is widely used in people's life, work, study, entertainment, and other aspects. For some specific occasions, a support bracket will need to be rotated, for swing and other movement of the display screen.

The support bracket usually moves the display screen through a power device. However, in actual use, the display screen may be subjected to external forces, resulting in overload of the power unit and damage to transmission mechanism in the support bracket and even the power unit.

SUMMARY

The present disclosure provides a rotating device providing rotation with failsafe release on overload and a rotatable display apparatus having the rotating device, to avoid overload damage to transmission mechanism and power unit.

A rotating device for connecting to and moving a displaying screen is disclosed, the rotating device includes a plurality of positioning assemblies, a connecting assembly, and a driving assembly. Each positioning assembly includes a positioning member and sleeving member, a first abutting portion is positioned in the sleeving member, a part of the positioning member is positioned in the sleeving member, and the positioning member abuts the first abutting portion. The connecting assembly includes a first end and a second end, a plurality of mounting grooves are defined on the first end, a part of the positioning assembly is positioned in the mounting groove. The driving assembly is connected to the first end, and the driving assembly abuts against the positioning member.

The present disclosure also provides a rotatable display apparatus, including a displaying screen panel and the rotating device as described above. The rotating device is connected to the display screen panel.

In the rotating device and the rotatable display apparatus of the present disclosure, a plurality of the positioning members abut the driving assembly to transmit force and movement from the driving assembly. When an external force received by the positioning member exceeds a predetermined value, the positioning member can move into the sleeving member, cutting off the transmission to the positioning member, preventing the driving assembly from being damaged caused by overload of the driving assembly when an external force is applied to the display screen panel, and safety of the rotatable display apparatus is improved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DESCRIPTION OF MAIN COMPONENTS OR ELEMENTS

Figure 1:
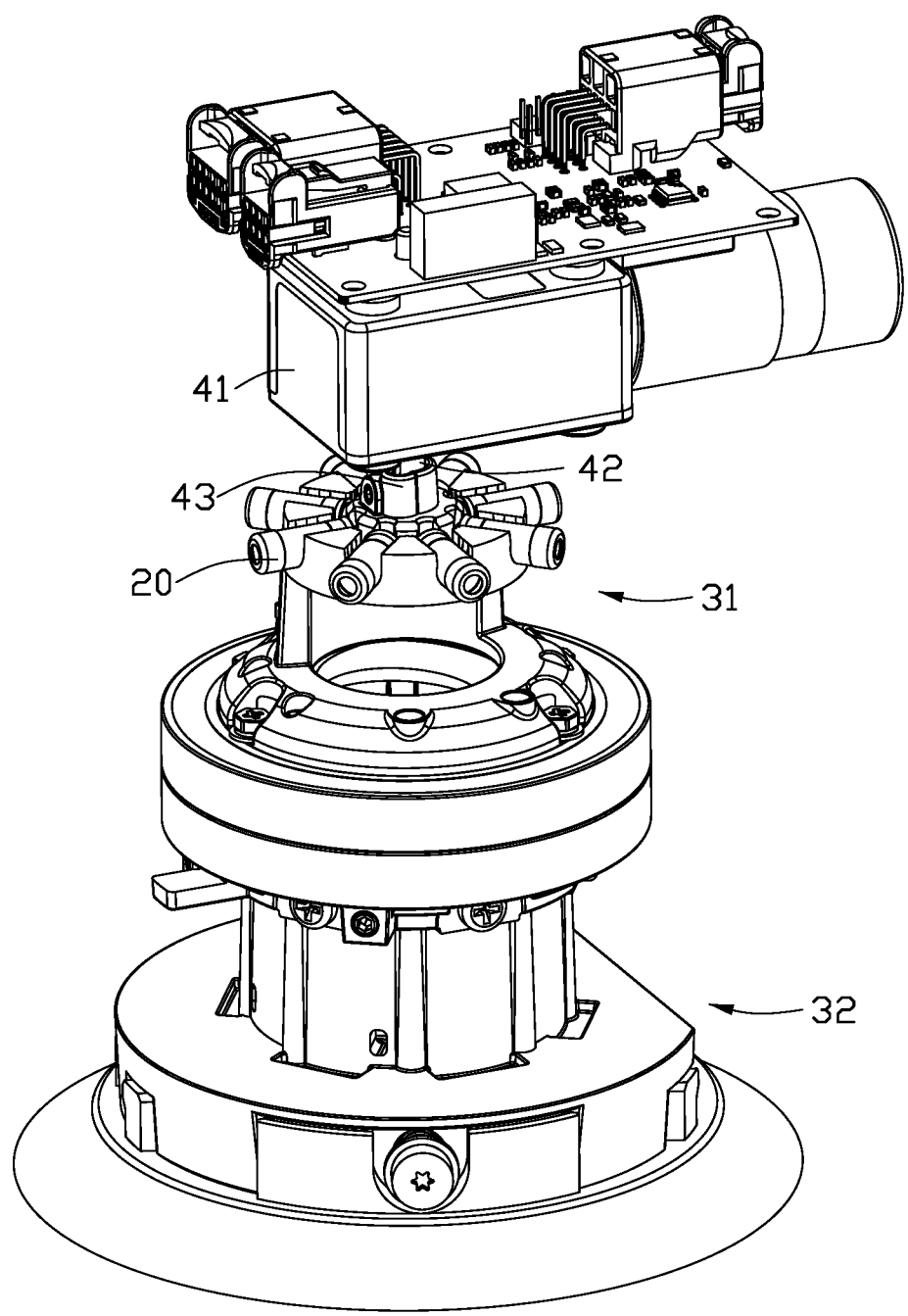
FIG. 1 is a schematic view of a rotating device in an embodiment according to the present disclosure.

Rotating device 100;
Displaying screen panel 10;
Positioning assembly 20;
Positioning member 21;
Sleeving member 22;
First abutting portion 221;
Second abutting portion 222;
Connecting assembly 30;
First end 31;
Mounting groove 311;
Second end 32;
Third abutting portion 33;
Driving assembly 40;
Driver 41;
Transmission shaft 42;
First plane 421;
Positioning screw 422;
Positioning portion 423;
Connecting member 43;
Through groove 431;
Second plane 432;
Positioning groove 433;
Receiving hole 434;
Through hole 435;
Step surface 436;
Rotatable display apparatus 200.

DETAILED DESCRIPTION

In order to make the above-mentioned objects, features, and advantages of the present disclosure more obvious, a description of specific embodiments of the present disclosure will be described with reference to the accompanying drawings. The present disclosure can be implemented in many ways different from those described herein, and those skilled in the art can make similar improvements without violating the contents of the present disclosure. Therefore, the present disclosure is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in the present disclosure herein are only for describing specific embodiments, and are not intended to limit the present disclosure.

Figure 2:
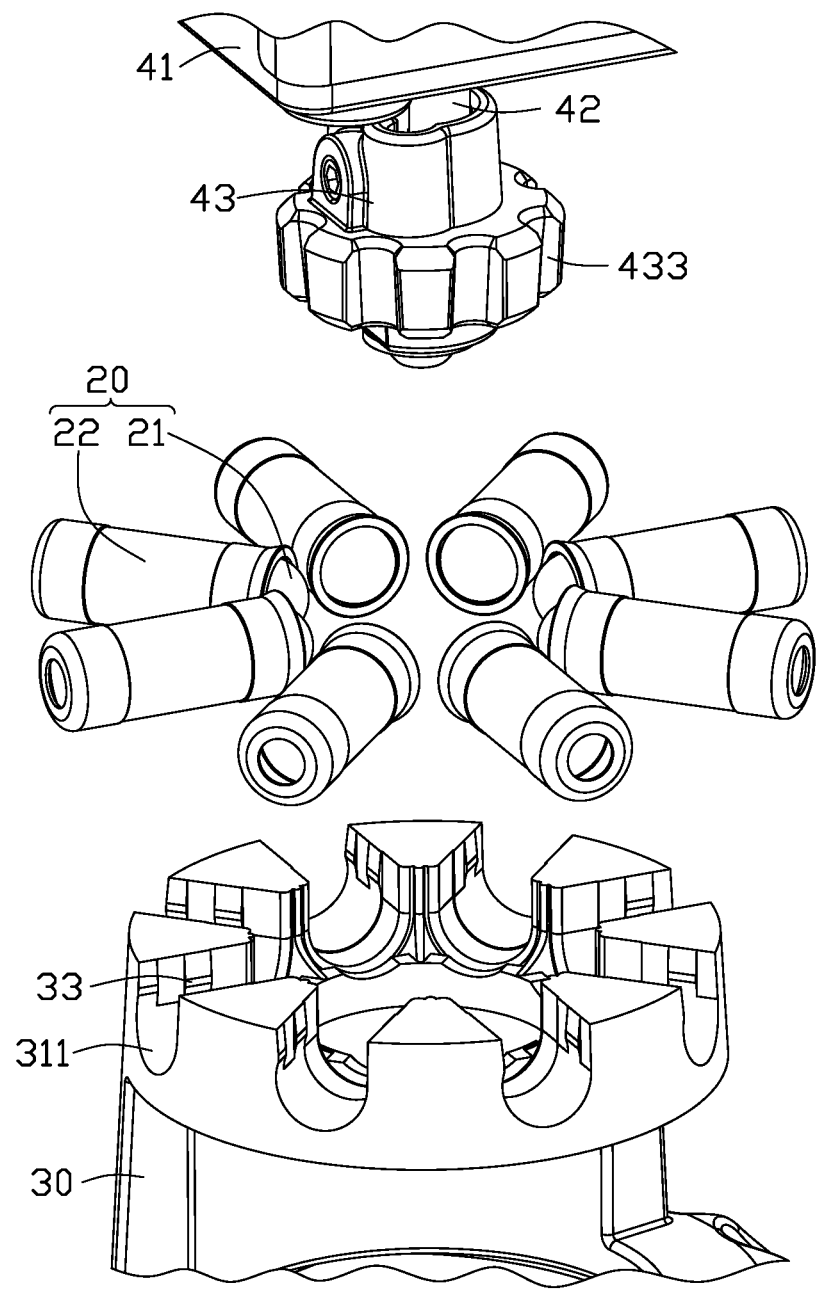
FIG. 2 is an exploded view of the rotating device of FIG. 1.
Figure 3:
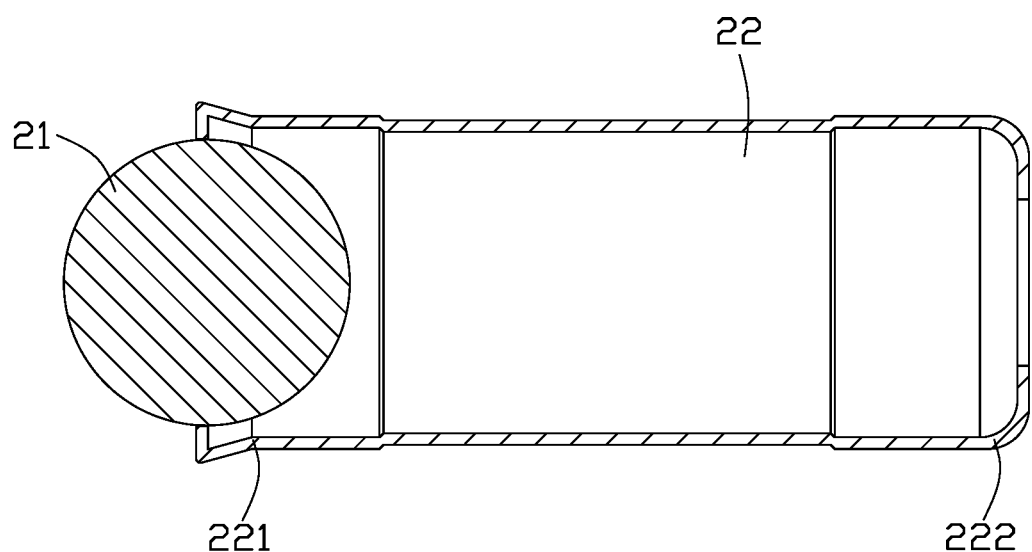
FIG. 3 is a cross section view of a positioning assembly of the rotating device in FIG. 1.

Referring to FIG. 1, FIG. 2, and FIG. 3, an embodiment of the present disclosure provides a rotating device 100 for supporting and rotating a display screen panel 10. The rotating device 100 includes a plurality of positioning assemblies 20, a connecting assembly 30, and a driving assembly 40. Each positioning assembly 20 includes a positioning member 21 and a sleeving member 22. A first abutting portion 221 is positioned in the sleeving member 22. The positioning member 21 is partially in the sleeving member 22, and the positioning member 21 abuts against the first abutting portion 221. The connecting assembly 30 includes a first end 31 and a second end 32 arranged opposite to each other. The first end 31 is defined with a plurality of mounting grooves 311. Each positioning assembly 20 is partially arranged in one of mounting grooves 311. The second end 32 of the connecting assembly 30 is configured to connect to the display screen panel 10. The driving assembly 40 is connected to the first end 31 of the connecting assembly 30, and the driving assembly 40 abuts against the positioning member 21. The driving assembly 40 can drive the connecting assembly 30 to rotate through the positioning assemblies 20.

In the embodiment of the present disclosure, the positioning member 21 is generally spherical, and the sleeving member 22 is generally a hollow cylinder. The first abutting portion 221 may be an annular protrusion arranged in a port of the sleeving member 22. The positioning member 21 is fixed at the port of the sleeving member 22 by the first abutting portion 221, part of the positioning member 21 protrudes out of the sleeving member 22, and part of spherical surface of the positioning member 21 faces outward. In other embodiments, the positioning member 21 may also be an ellipsoid structure, or an end of the positioning member 21 exposed sleeve member 22 is an arc structure. The part of the positioning member 21 exposing the sleeve member 22 is abutted against the first end 31 of the driving assembly 40. The first abutting portion 221 abuts the periphery of the positioning member 21. When an external force such as an impact or wind pressure received by the positioning member 21 exceeds a predetermined value, the positioning member 21 deforms the port of the sleeving member 22, then the positioning member 21 crosses the first abutting portion 221 and moves into the sleeving member 22. Thereby, the driving assembly 40 is spaced from the positioning member 21, the positioning assembly 20 no longer exerts force on the driving assembly 40. The driving assembly 40 will not be damaged by an extended external force applied on the positioning assembly 20 through the displaying screen panel 10.

The first end 31 of the positioning assembly 20 is defined with a plurality of mounting grooves 311. An axial portion of the first end 31 is connected with the driving assembly 40, and the mounting grooves 311 are evenly positioned around the axial portion to balance forces applied on the driving assembly 40 from the positioning assemblies 20. In the embodiment of the present disclosure, there are eight mounting grooves 311, and an angle formed between adjacent mounting grooves 311 is 45 degrees.

The driving assembly 40 includes a driver 41, a transmission shaft 42, and a connecting member 43. The transmission shaft 42 connects the driver 41 and the connecting member 43. The connecting member 43 abuts against the positioning members 21.

In the embodiment of the present disclosure, the driver 41 is a motor, but not limited thereto. Driver 41 transmits power to the connecting assembly 30 through transmission shaft 42. The connecting member 43 is sleeved on a periphery of the transmission shaft 42. The connecting member 43 rotates synchronously with the transmission shaft 42, and transmits torque to the positioning assembly 20 by abutting against the positioning members 21.

Figure 4:
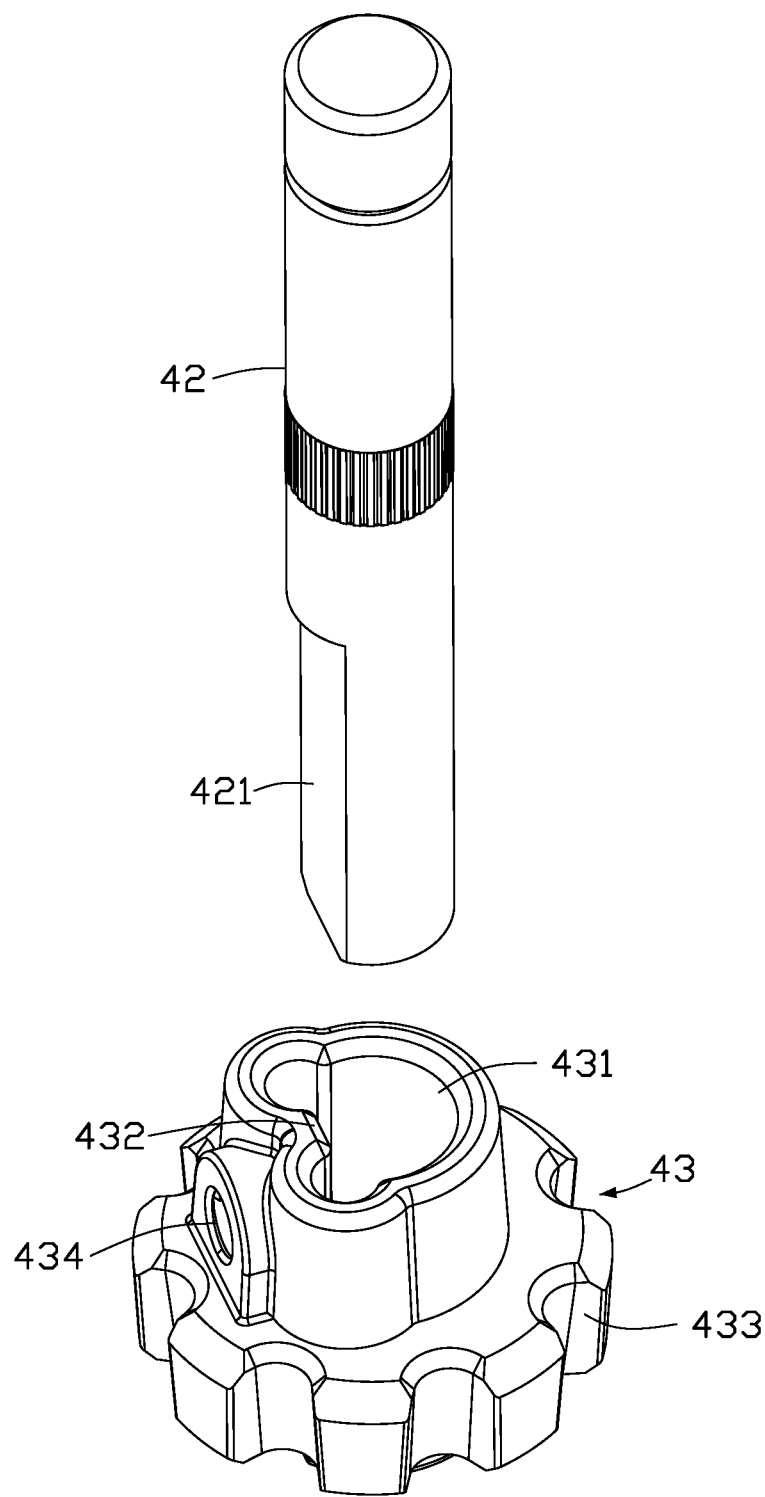
FIG. 4 is an exploded view of a transmission shaft and a connecting member of the rotating device of FIG. 1.
Figure 5:
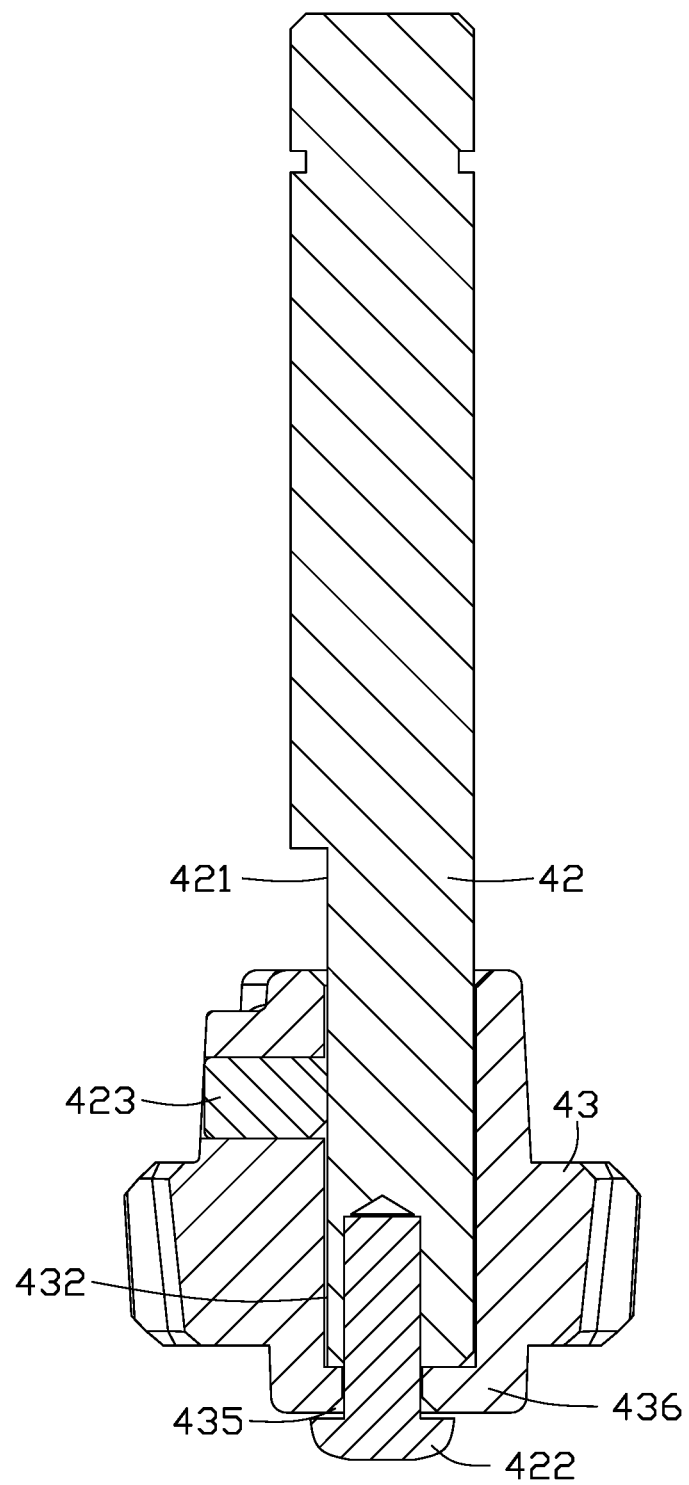
FIG. 5 is a cross section view of the transmission shaft and the connecting member of the rotating device of FIG. 1.

Referring to FIG. 4 and FIG. 5, the connecting member 43 is defined with a through groove 431. The transmission shaft 42 is partially positioned in the through grove 431. Positioning grooves 433 are defined on a periphery of the connecting member 43. When the connecting member 43 is connected with the first end 31 of the connecting assembly 30, the positioning grooves 433 are aligned with the mounting grooves 311 along a radial direction of the connecting member 43. The positioning member 21 is partially received in the positioning groove 433. One end of the transmission shaft 42 away from the driver 41 is arranged in the through groove 431, and the transmission shaft 42 is fixed to the connecting member 43, so that the transmission shaft 42 can transmit torque to the connecting member 43. Shapes of the positioning grooves 433 correspond those of the positioning members 21. In the embodiment of the present disclosure, the positioning members 21 are generally in a spherical structure, and the positioning grooves 433 are set as an arc-shaped inner depression structure. When each positioning member 21 is partially positioned in one positioning groove 433, an inner surface of the positioning groove 433 is stably abutted against the outer surface of the positioning member 21. The driver 41 can transmit torque to the connecting assembly 30 through the positioning member 20.

Referring to FIG. 4, an outer side of the transmission shaft 42 includes a first plane 421, and an inner side of the through groove 431 of the connecting member 43 is provided with a second plane 432. When the transmission shaft 42 is arranged in the through groove 431, the first plane 421 abuts against the second plane 432, and an arc portion of the outer side of the transmission shaft 42 abuts against other arc portion of the inner side of the through groove 431, so as to improve stability of connection between the transmission shaft 42 and the connecting member 43. A sliding movement between the transmission shaft 42 and the connecting member 43 is thus avoided.

Furthermore, a receiving hole 434 is defined on the connecting member 43. The receiving hole 434 passes through the second plane 432 and communicates with the through groove 431. A positioning portion 423 is detachably positioned on the first plane 421, and the positioning portion 423 is received in the receiving hole 434. In an embodiment of the present disclosure, an outer surface of the positioning portion 423 is defined with external threads, and an inner surface of the receiving hole 434 is defined with internal threads corresponding to the external thread. When the transmission shaft 42 is connected to the connecting member 43, the positioning portion 423 is screwed into the receiving hole 434 to further strengthen the junction of the transmission shaft 42 and the connecting member 43.

Furthermore, a through hole 435 is defined on the end of the connecting member 43 away from the driving assembly 40. A diameter of the through hole 435 is smaller than a diameter of the through groove 431. A step surface 436 is formed between the through hole 435 and the through groove 431, and the step surface 436 abuts against the transmission shaft 42 to maintain the relative positions between the connecting member 43 and the transmission shaft 42.

Furthermore, the driving assembly 40 includes a positioning screw 422. The positioning screw 422 is connected to the transmission shaft 42 through the through hole 435 to strengthen the junction of the connecting member 43 and the transmission shaft 42. Therefore, relative sliding between the connecting member 43 and the transmission shaft 42 during rotation may be avoided, and a reliable driving of the display screen panel 10 may be achieved.

FIG. 3, in an embodiment of the present disclosure, shows that the sleeve member 22 is provided with a second abutting portion 222. The second abutting portion 222 is arranged at the side of the first abutting portion 221 away from the positioning member 21, and the second abutting portion 222 is configured for supporting the positioning member 21. When the positioning member 21 is subjected to a force exceeding a predetermined value, and the positioning member 21 disengages from the first abutting portion 221, the second abutting portion 222 may limit a sliding range of the positioning member 21, to prevent detachment of the positioning member 21 from the other end of the sleeve member 22 and affecting other components or mechanisms.

Furthermore, referring to FIG. 2, a side wall of the mounting groove 311 is defined with a third abutting portion 33 for supporting the sleeve member 22. When the positioning member 21 is installed in the connecting assembly 30, the positioning assembly 20 can abut against the connecting member 43 and the third abutting portion 33 at the same time, to fix the positioning member 21.

Figure 6:
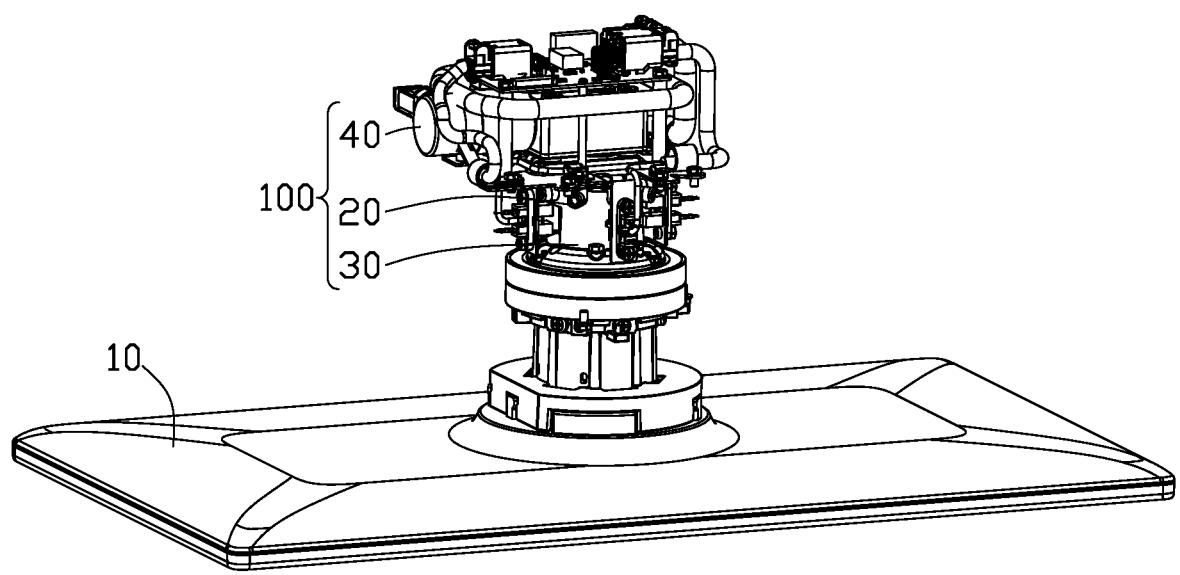
FIG. 6 is schematic view of a rotatable display apparatus in an embodiment according to the present disclosure.

Referring to FIG. 6, the present disclosure also provides a rotatable display apparatus 200. The rotatable display apparatus 200 includes a displaying screen panel and the rotating device 100 as above. The rotating device 100 is connected to the display screen panel 10.

During use of the rotatable display apparatus 200, the driver 41 transmits torque through the transmission shaft 42 and the connecting member 43. The connecting member 43 abuts against the positioning assembly 20 through the positioning groove 433, so as to transmit the torque to the positioning assembly 20, driving the whole connecting assembly 30 to rotate, and change direction or orientation of the displaying screen panel 10. When an external force is applied on the displaying screen panel 10, a resistance to rotation of the connecting assembly 30 will be increased. If the resistance exceeds a predetermined value, the positioning member 21 will be pushed into the sleeving member 22, and the positioning member 21 no longer abuts against the positioning groove 433 of the connecting member 43. At this time, the driving assembly 40 is separated from the connecting assembly 30, and the driver 41 becomes idle, to avoid damage of the driver 41 due to overload caused by the external force applied on the display screen panel 10. Safety and reliability of the rotating device 100 is improved. After the positioning member 21 is pushed into the sleeving member 22, the rotating device 100 can be disassembled, and the positioning member 21 may be reset for further use, which improves a service life and practicability of the rotating device 100.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A rotating device, for connecting and moving a displaying screen, the rotating device comprising:
   a plurality of positioning assemblies, each positioning assembly comprising a positioning member and sleeving member, a first abutting portion positioned in the sleeving member, a part of the positioning member positioned in the sleeving member, and the positioning member abut the first abutting portion;
   a connecting assembly comprising a first end and a second end, a plurality of mounting grooves defined on the first end, the plurality of positioning assemblies being positioned in the mounting grooves;
   a third abutting portion is positioned on a side wall of each of the plurality of mounting grooves, the third abutting portion abuts against the sleeving member; and
   a driving assembly connected to the first end, and the driving assembly abut against the positioning member.

2. The rotating device of claim 1, wherein the driving assembly comprises a driver, a transmission shaft, and a connecting member, the transmission shaft is connected to the connecting member, the connecting member abuts against the positioning member.

3. The rotating device of claim 2, wherein a through groove is defined on the connecting member, the transmission shaft is positioned in the through groove; a plurality of positioning grooves are defined at an outer side of the connecting member, the plurality of the positioning grooves are corresponding to the plurality of the mounting grooves, a part of the positioning member is positioned in the positioning groove.

4. The rotating device of claim 3, wherein a first plane is defined on an outer surface of the transmission shaft, a second plane is defined on an inner surface of the connecting member; when the transmission shaft is positioned in the through groove, the first plane is attached to the second plane.

5. The rotating device of claim 4, wherein a receiving hole is defined on the second plane of the connecting member, and the receiving hole is communicated with the through groove; a fixing member is detachably connected on the first plane, and the fixing member is positioned in the receiving hole.

6. The rotating device of claim 3, wherein a through hole is defined on a side of the connecting member away from the driving assembly, a diameter of the through hole is less than a diameter of the through groove, a step surface is formed between the through hole and the through groove, the step surface abuts against the transmission shaft.

7. The rotating device of claim 6, wherein a positioning screw is positioned in the through hole, and the positioning screw connects the transmission shaft and the connecting member.

8. The rotating device of claim 1, wherein a second abutting portion is positioned in the sleeving member, and the second abutting portion is located at a side of the first abutting portion away from the positioning member.

9. A rotatable display apparatus comprising:
   a displaying screen panel; and
   a rotating device connected to the displaying screen panel, wherein the rotating device comprising:
   a plurality of positioning assemblies comprising a positioning member, sleeving member, and a first abutting portion positioned in the sleeving member, a part of the positioning member being positioned in the sleeving member, and the positioning member abut the first abutting portion;
   a connecting assembly comprising a first end and a second end, a plurality of mounting grooves defined on the first end, the plurality of positioning assemblies being positioned in the mounting grooves;
   a third abutting portion is positioned on a side wall of each of the plurality of mounting grooves, the third abutting portion abuts against the sleeving member; and
   a driving assembly connected to the first end, and the driving assembly abut against the positioning member.

10. The rotatable display apparatus of claim 9, wherein the driving assembly comprises a driver, a transmission shaft, and a connecting member, the transmission shaft is connected to the connecting member, the connecting member abuts against the positioning member.

11. The rotatable display apparatus of claim 10, wherein a through groove is defined on the connecting member, the transmission shaft is positioned in the through groove; a plurality of positioning grooves are defined at an outer side of the connecting member, the plurality of the positioning grooves are corresponding to the plurality of the mounting grooves, a part of the positioning member is positioned in the positioning groove.

12. The rotatable display apparatus of claim 11, wherein a first plane is defined on an outer surface of the transmission shaft, a second plane is defined on an inner surface of the connecting member; when the transmission shaft is positioned in the through groove, the first plane is attached to the second plane.

13. The rotatable display apparatus of claim 12, wherein a receiving hole is defined on the second plane of the connecting member, and the receiving hole is communicated with the through groove; a fixing member is detachably connected on the first plane, and the fixing member is positioned in the receiving hole.

14. The rotatable display apparatus of claim 11, wherein a through hole is defined on a side of the connecting member away from the driving assembly, a diameter of the through hole is less than a diameter of the through groove, a step surface is formed between the through hole and the through groove, the step surface abuts against the transmission shaft.

15. The rotatable display apparatus of claim 14, wherein a positioning screw is positioned in the through hole, and the positioning screw connects the transmission shaft and the connecting member.

16. The rotatable display apparatus of claim 9, wherein a second abutting portion is positioned in the sleeving member, and the second abutting portion is located at a side of the first abutting portion away from the positioning member.

* * * * *